US011371887B2

(12) United States Patent
Wasserman et al.

(10) Patent No.: US 11,371,887 B2
(45) Date of Patent: Jun. 28, 2022

(54) TUNABLE COHERENT LIGHT FILTER FOR OPTICAL SENSING AND IMAGING

(71) Applicants: Board of Regents, The University of Texas System, Austin, TX (US); National Technology & Engineering Solutions of Sandia, LLC, Albuquerque, NM (US)

(72) Inventors: Daniel Wasserman, West Lake Hills, TX (US); Eric A. Shaner, Albuquerque, NM (US)

(73) Assignees: BOARD OF REGENTS, THE UNIVERSITY OF TEXAS SYSTEM, Austin, TX (US); U.S. DEPARTMENT OF ENERGY, Washington, DC (US)

( * ) Notice: Subject to any disclaimer, the term of this patent is extended or adjusted under 35 U.S.C. 154(b) by 0 days.

(21) Appl. No.: 16/937,954

(22) Filed: Jul. 24, 2020

(65) Prior Publication Data
US 2021/0025760 A1    Jan. 28, 2021

Related U.S. Application Data

(60) Provisional application No. 62/878,863, filed on Jul. 26, 2019.

(51) Int. Cl.
*G01J 5/06* (2022.01)
*G01J 3/45* (2006.01)
(Continued)

(52) U.S. Cl.
CPC .............. *G01J 5/06* (2013.01); *G01J 3/021* (2013.01); *G01J 3/2803* (2013.01); *G01J 3/45* (2013.01);
(Continued)

(58) Field of Classification Search
CPC ...... G01J 5/06; G01J 3/45; G01J 3/021; G01J 5/10; G01J 3/2803; G01J 2005/106;
(Continued)

(56) References Cited

U.S. PATENT DOCUMENTS

| | | | |
|---|---|---|---|
| 2011/0222067 A1* | 9/2011 | Saadany | G02B 26/0841 356/450 |
| 2014/0139839 A1* | 5/2014 | Medhat | G01J 3/4532 356/450 |

(Continued)

FOREIGN PATENT DOCUMENTS

| | | | |
|---|---|---|---|
| CN | 111896103 A | * | 11/2020 |
| JP | H11173921 A | * | 7/1999 |

(Continued)

OTHER PUBLICATIONS

Coutinho, R. C., French, H. A., Selviah, D. R., Wickramasinghe, D., & Griffiths, H. D. (Nov. 1999). Detection of coherent light in an incoherent background [for IRST]. In 1999 IEEE LEOS Annual Meeting Conference Proceedings. LEOS'99. 12th Annual Meeting. IEEE Lasers and Electro-Optics Society 1999 Annual Meeting (Cat. No. 99CH37009) (vol. 1, pp. 247-248). IEEE.

(Continued)

*Primary Examiner* — Marcus H Taningco
(74) *Attorney, Agent, or Firm* — Meunier Carlin & Curfman LLC

(57) ABSTRACT

Systems and methods are provided for filtering coherent infrared light from a thermal background for protection of infrared (IR) imaging arrays and detection systems. A Michelson interferometer is used for coherent light filtering. In an implementation, a system includes a fixed mirror, a beam splitter, and a moving mirror which can be controlled translationally, as well as tip/tilt. The Michelson interferometer may be used as an imaging system. For imaging applications, a system may comprise a tunable array of (Continued)

micro-electromechanical systems (MEMS) mirrors. A mid-wave IR interferometer with electronic feedback and MEMS mirror array is provided.

20 Claims, 8 Drawing Sheets

(51) Int. Cl.
G01J 3/02 (2006.01)
G01J 5/10 (2006.01)
G01J 3/28 (2006.01)

(52) U.S. Cl.
CPC ......... *G01J 5/10* (2013.01); *G01J 2003/2813* (2013.01); *G01J 2005/106* (2013.01)

(58) Field of Classification Search
CPC ....... G01J 2003/2813; G01J 2005/0077; G01J 3/453; G01J 1/0295; G01J 3/0297; G01J 2001/0285
See application file for complete search history.

(56) References Cited

U.S. PATENT DOCUMENTS

2016/0231172 A1* 8/2016 Medhat .............. G02B 26/0841
2021/0190590 A1* 6/2021 Muramatsu ........ G01B 9/02044

FOREIGN PATENT DOCUMENTS

JP      2005505774 A  *  2/2005
WO   WO-2008101964 A1  *  8/2008  ........... A61B 5/0066

OTHER PUBLICATIONS

Gruber Jr, Thomas, et al. "A small, low-cost, hyperspectral imaging FTIR sensor design for standoff detection applications." Next-Generation Spectroscopic Technologies V. vol. 8374. International Society for Optics and Photonics, 2012.

* cited by examiner

200

300

400

600

TUNABLE COHERENT LIGHT FILTER FOR OPTICAL SENSING AND IMAGING

CROSS-REFERENCE TO RELATED APPLICATIONS

This application claims the benefit of priority to U.S. Provisional Patent Application No. 62/878,863, filed on Jul. 26, 2019, entitled "TUNABLE COHERENT LIGHT FILTER FOR OPTICAL SENSING AND IMAGING," the contents of which are hereby incorporated by reference in their entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

BACKGROUND

The mid-infrared (mid-IR) wavelength range is of vital importance for a range of sensing, security and defense, and fundamental science applications. One of the primary applications for mid-IR technologies is the use of infrared imaging arrays for thermal imaging applications. For defense applications, these imagers are used as night vision goggles, and as imagers on aircraft and vehicles. Such imaging systems can be disabled by IR "jamming" techniques, which typically involve the use of high powered lasers to saturate or even destroy the pixels of the imaging system.

Thus, there is significant interest in developing techniques, structures, or devices to protect these imaging arrays from such attacks. One possible approach is the development of narrow band notch filters, which are designed for a single wavelength, blocking the design wavelength and passing all other wavelengths. Such structures can be quite effective (using thin film interference or more recently guided resonance mode filters). However, such filters are not tunable, which means that for a jamming laser which is capable of jumping around the spectrum, theses filters are not suitable. It is expected that such tunable jamming lasers will be deployed in the near future.

SUMMARY

An interferometric approach is provided for filtering coherent infrared (IR) light from a thermal background for protection of IR imaging arrays and detection systems. In an implementation, a system includes a fixed mirror, a beam splitter, and a moving mirror which can be controlled translationally, as well as tip/tilt.

In some implementations, for imaging applications, a system may comprise a tunable array of micro-electromechanical systems (MEMS) mirrors.

In some implementations, a mid-wave IR interferometer with electronic feedback and MEMS mirror array is provided.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
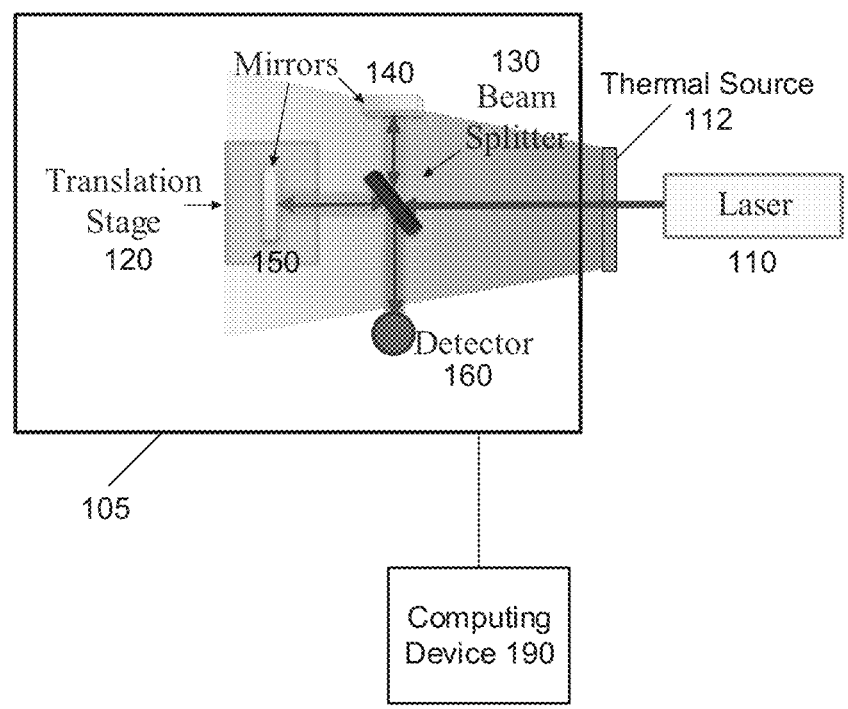
FIG. 1 is a diagram of an exemplary system for tunable coherent light filtering.
Figure 10:
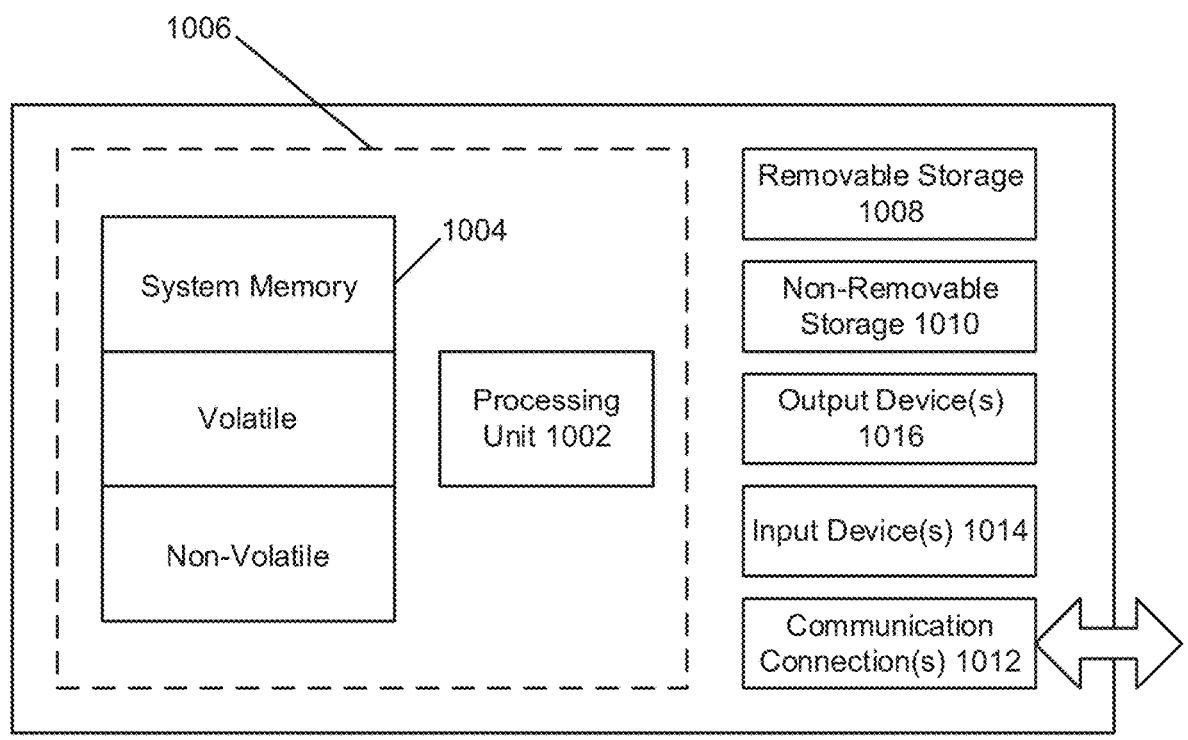
FIG. 10 shows an exemplary computing environment in which example embodiments and aspects may be implemented.

FIG. 1 is a diagram of an exemplary system 100 for tunable coherent light filtering. In the system 100, a Michelson interferometer 105 is in communication with a computing device 190. In some implementations, the Michelson interferometer 105 and the computing device 190 may be in communication with each other through a network, or in direct communication without a network connection. In other implementations, the computing device 190 may be integrated into the Michelson interferometer 105, e.g., in a programmable field programmable gate array (FPGA) type system. A suitable computing device is illustrated in FIG. 10 as the computing device 1000. Although only Michelson interferometer 105 and one computing device 190 are shown in FIG. 1, there is no limit to the number of Michelson interferometers 105 and computing devices 190 that may be supported.

As described further herein, the computing device 190 may measure a signal from a detector 160 as a function of a position of one or more of the mirrors 140, 150.

The Michelson interferometer 105 (alone in some implementations, and in conjunction with the computing device 190 in other implementations) provide the ability to filter coherent IR signals, which is of vital importance for protecting IR imaging arrays. As described further herein, the Michelson interferometer 105 is used for coherent light filtering. In some implementations, the Michelson interferometer 105 may be used as an imaging system (as opposed to simply integrating the intensity of the transmitted signal).

The disclosed invention takes a different approach to filtering a jamming signal (i.e., the incident light (e.g., from a light source, such as the laser 110)), focusing on the coherent nature of the jamming signal, as opposed to its spectral signature.

The Michelson interferometer 105 comprises a translation stage 120 which may be used to adjust one or more of the two reflecting mirrors 140, 150 (e.g., translationally, as well as tip/tilt), a beam splitter 130, and a detector 160. In an implementation, one of the reflecting mirrors (e.g., the mirror 140) is fixed, and the other mirror (e.g., the mirror 150) is mobile (can be moved translationally, tilted, and/or tipped). A light source 110, such as a laser, is shown in FIG. 1, along with a thermal source 112. The light source 110 and the thermal source 112 are external to the Michelson interferometer 105.

The beam splitter 130 splits the incident light from the light source 110 into two arms terminated by the mirrors 140, 150, respectively. The split beam travels the length of the two arms and then returns to the beam splitter 130, where it is recombined and then travels on to the detector 160.

In some implementations, the detector 160 comprises an imaging array, such as an infrared focal plane array (FPA) or a charge coupled device (CCD) detector. In some implementations, the moving mirror (e.g., the minor 150) comprises a mirror array, such as a micro-electromechanical systems (MEMS) minor array.

If the arm lengths are equal (so-called zero path difference or ZPD), then the light recombines constructively and the full signal is detected at the image plane of the detector 160. If, however, the two arms have a length difference of $\Delta d$ (total path length difference of $2\Delta d$), then light having wavelength $\lambda=4\Delta d$ will interfere destructively and will not be detected at the image plane of the detector 160.

Thus, as the translation stage 120 is adjusted (e.g., manually, responsive to feedback, by instructions received from the computing device 190, etc.) so that the moving arm pertaining to the mirror 150 is translated, one would expect to see a series of constructive and destructive interference peaks and valleys. The intensity vs. path length plot is known as an interferogram, and taking the Fourier transform of an interferogram gives the spectrum of the incident light (the basis of the Fourier transform infrared (FTIR) spectrometer). However, this analysis, in addition to assuming the light is monochromatic, assumes the light is perfectly coherent, such that infinitely long path differences still result in interference. This is a reasonable assumption for a laser, but not, it turns out, for incoherent light. Incoherent light will show interference fringes near the ZPD position, but the amplitude of these fringes will quickly die out as path length difference increases. At lengths greater than the coherence length of the light, one basically sees no more interference, with one-half of the light transmitted to the detector 160, and the other one-half of the light reflected back to the light source 110.

Thus, in accordance with implementations, the Michelson interferometer 105 can be positioned such that the path length difference is greater than the coherence length, and can pass 50% of the incoherent light, and depending on the fine position of the minor, can either block or pass ~100% of the coherent signal. Moreover, slight changes in the mirror position of the mirror 150 allows for the filtering (blocking) of coherent signals across a broad range of IR wavelengths. Although embodiments and examples herein are directed to light have IR wavelengths, the invention is not limited to these wavelengths, and other wavelengths of light are contemplated, such as light having wavelengths in the range from ultraviolet (UV) to visible to terahertz (THz), for example.

In an embodiment, the Michelson interferometer 105 operates away from ZPD, through which one can image, and is dynamically controlled via electronic feedback mechanisms of the computing device 190, in order to block any monochromatic coherent signal of the light source 110. In addition, a dynamic pixelated minor may be used as one or both of the minors 140, 150 to individually minimize coherent light transmission by control of MEMS micromirrors. In this manner, a MEMS minor array may be provided with electronic feedback for high speed dynamic filtering of coherent light.

The translation stage 120 may be stepped through to adjust the movable minor 150 position to find where the coherent light destructively interferes. Whenever the minor is not close to the position of ZPD, incoherent light interferes very little, but coherent light exhibits minima and maxima.

Figure 2:
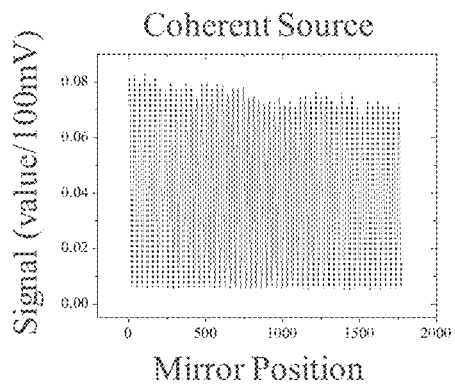
FIG. 2 is an illustration of an exemplary interferogram showing coherent behavior.
Figure 3:
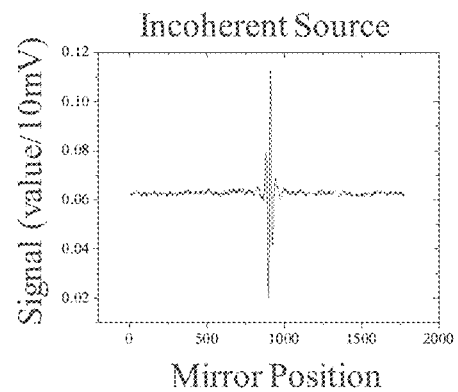
FIG. 3 is an illustration of an exemplary interferogram showing incoherent behavior.

FIG. 2 is an illustration of an exemplary interferogram 200 showing coherent behavior (i.e., interferogram of coherent light). FIG. 3 is an illustration of an exemplary interferogram 300 showing incoherent behavior (i.e., interferogram of incoherent light). As shown in the interferograms 200, 300, respectively, the coherent light has many maximums of similar height, while the incoherent light only forms one large maximum.

Figure 4:
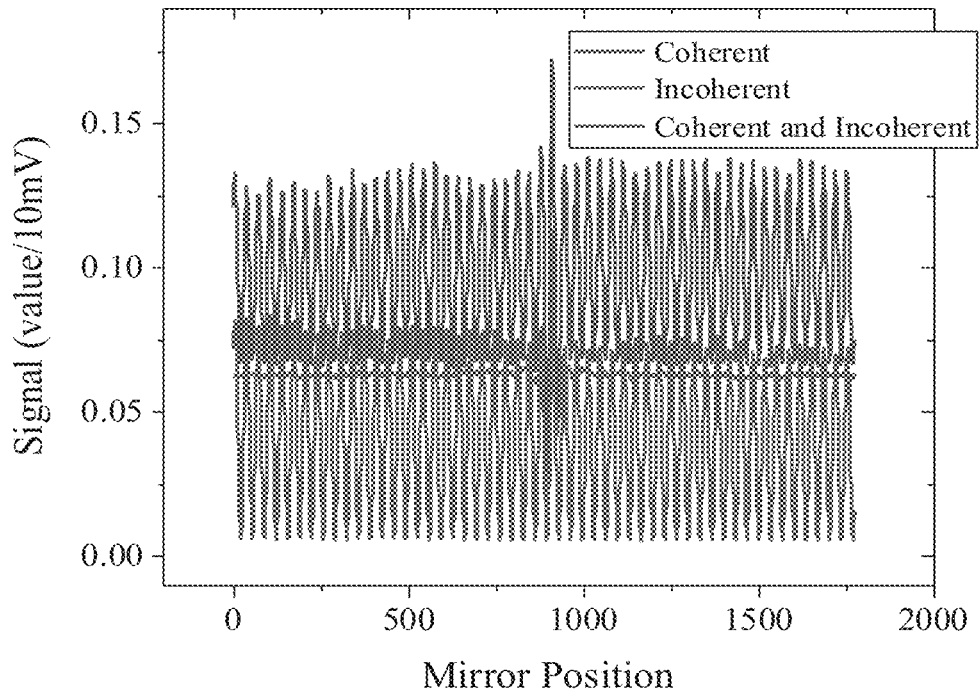
FIG. 4 is an illustration of an exemplary interferogram showing combined coherent behavior and incoherent behavior.

FIG. 4 is an illustration of an exemplary interferogram 400 showing combined coherent behavior and incoherent behavior. The interferogram 400 shows that if the mirror is held away from ZPD, it can be fine adjusted to sit a signal maximum (e.g., 50% of the incoherent light and nearly 100% of the coherent light reaching the detector 160) or at a minimum (e.g., 50% of the incoherent light and nearly 0% of the coherent light reaching the detector 160).

Figure 5:
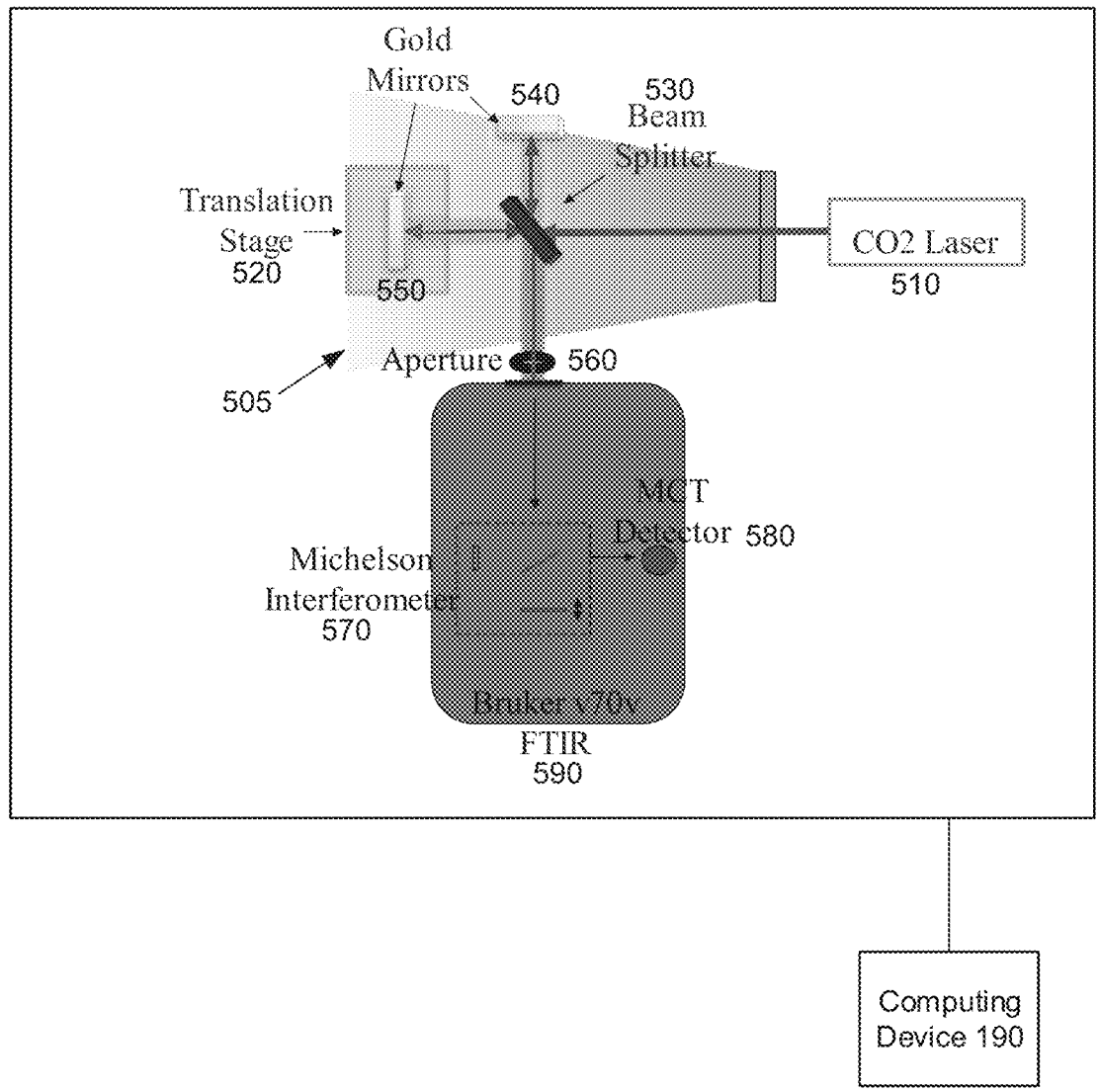
FIG. 5 is an illustration of an exemplary system for performing and testing for tunable coherent light filtering.

FIG. 5 is an illustration of an exemplary system 500 for performing and testing for tunable coherent light filtering. The system comprises two Michelson interferometers 505, 570. The Michelson interferometer 505 comprises a translation stage 520 which may be used to adjust one or more of the two reflecting mirrors 540, 550 (shown as gold minors), and a beam splitter 530. In an implementation, one of the reflecting minors (e.g., the mirror 540) is fixed, and the other minor (e.g., the mirror 550) is mobile. Coherent light, which ultimately is to be filtered, is generated by a light source 510, which in an implementation comprises a $CO_2$ laser.

The Michelson interferometer 505 is similar to the Michelson interferometer 105 but does not have a detector such as the detector 160. Instead, the system 500 comprises an aperture 560 through which the recombined light beam passes to a Fourier-transform infrared spectroscopy (FTIR) spectrometer 590. In implementation, the FTIR spectrometer 590 is a VERTEX 70v FTIR spectrometer. The FTIR spectrometer 590 comprises the Michelson interferometer 570 and an MCT (mercury cadmium telluride or HgCdTe) detector 580.

The Michelson interferometer 505 is placed outside the FTIR spectrometer 590 and is used to minimize the coherent light before scanning the recombined light beam with the FTIR spectrometer 590. Thus, the Michelson interferometer 505 filters the coherent light before it reaches the FTIR spectrometer 590. The remaining signal (the recombined light beam) can then be scanned to determine what proportion of the original light is filtered. The invention is thus integrated into an emission spectroscopy scheme to show that it can filter coherent light from incoherent light. A computing device 190 may be implemented to receive, store, and/or display or otherwise output results from the FTIR spectrometer 190.

Figure 6:
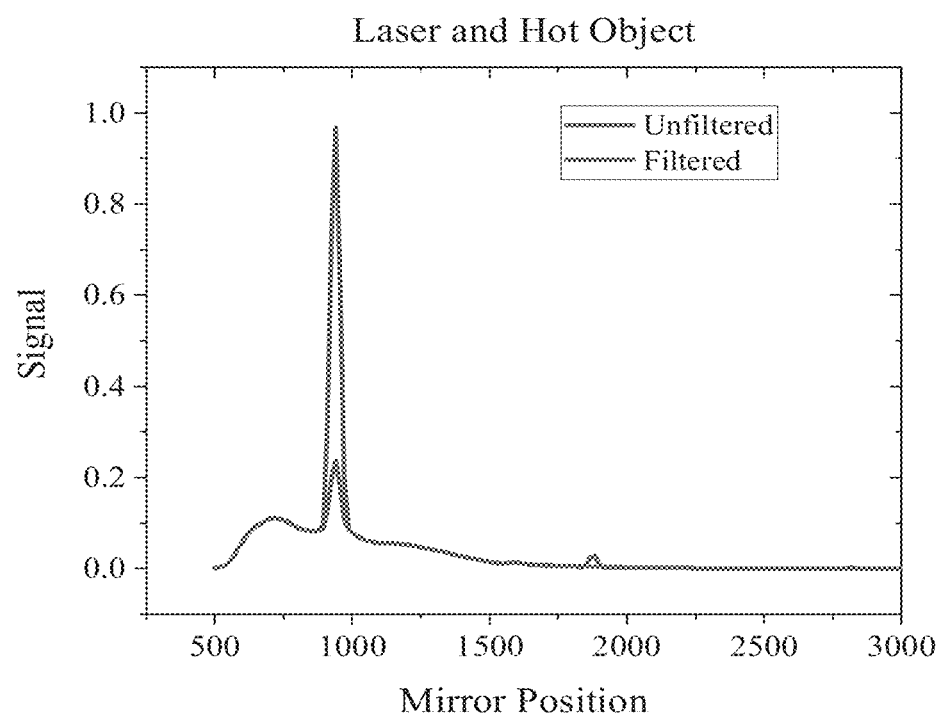
FIG. 6 is an illustration of an exemplary scan showing test results.

FIG. 6 is an illustration of an exemplary scan 600 showing test results. The scan 600 shows an extinction ratio of about 90/12, or −8.75 dB. Better alignment of the interferometers will improve the extinction ratio.

Figure 7:
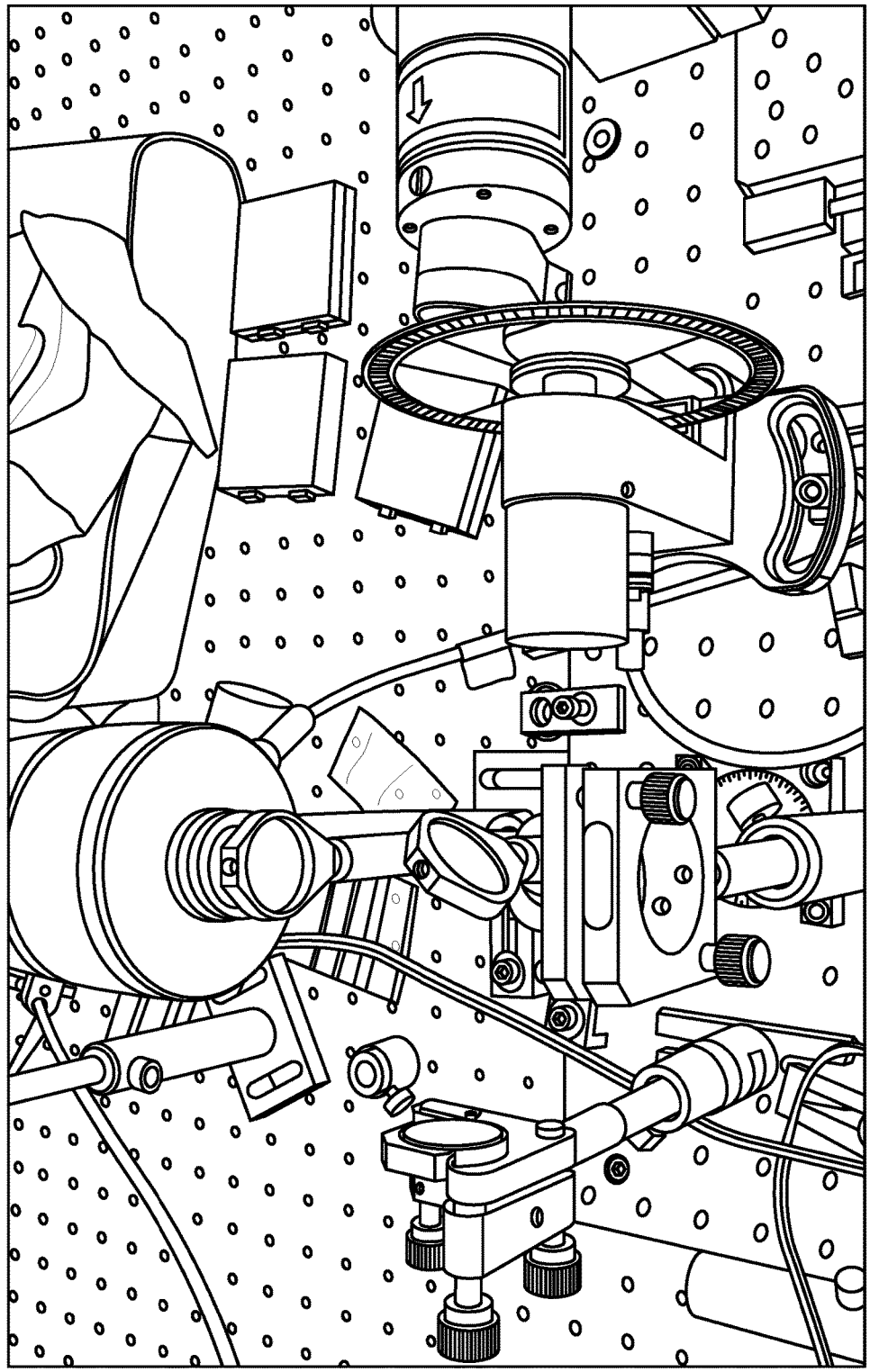
FIG. 7 is an illustration of a stand-alone interferometer with a 3.39 μm HeNe laser source.

FIG. 7 is an illustration of a stand-alone interferometer 700. The interferometer 700 is a home-built interferometer with a 3.39 μm HeNe laser source.

Figure 8:
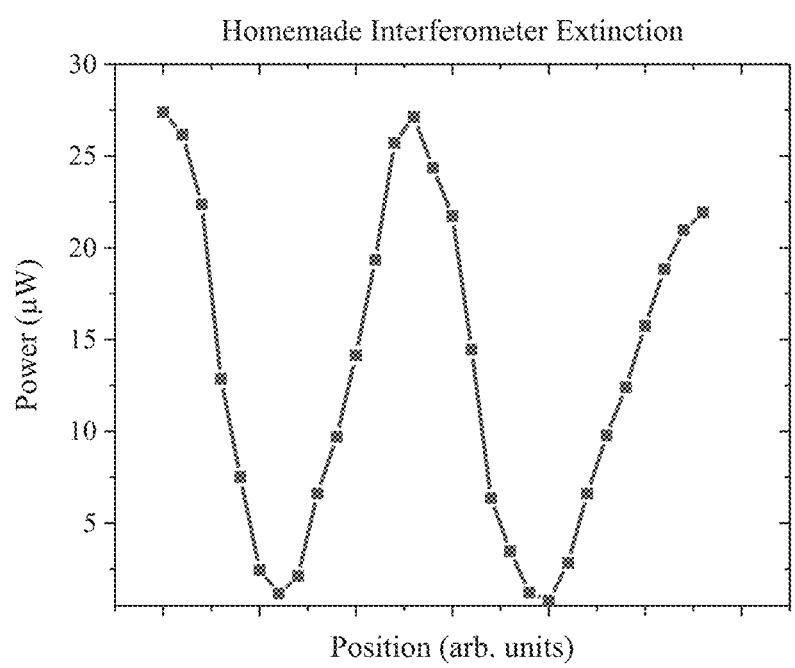
FIG. 8 is an illustration of a plot of the signal through the interferometer of FIG. 7 as function of mirror position.

FIG. 8 is an illustration of a plot 800 of the signal through the interferometer 700 of FIG. 7 as function of mirror position. The plot 800 demonstrates ~97% attenuation from peak transmission when the mirror is positioned at an interference null. Thus, when the mirror position is scanned, there is an extinction of the signal of about 97%.

Figure 9:
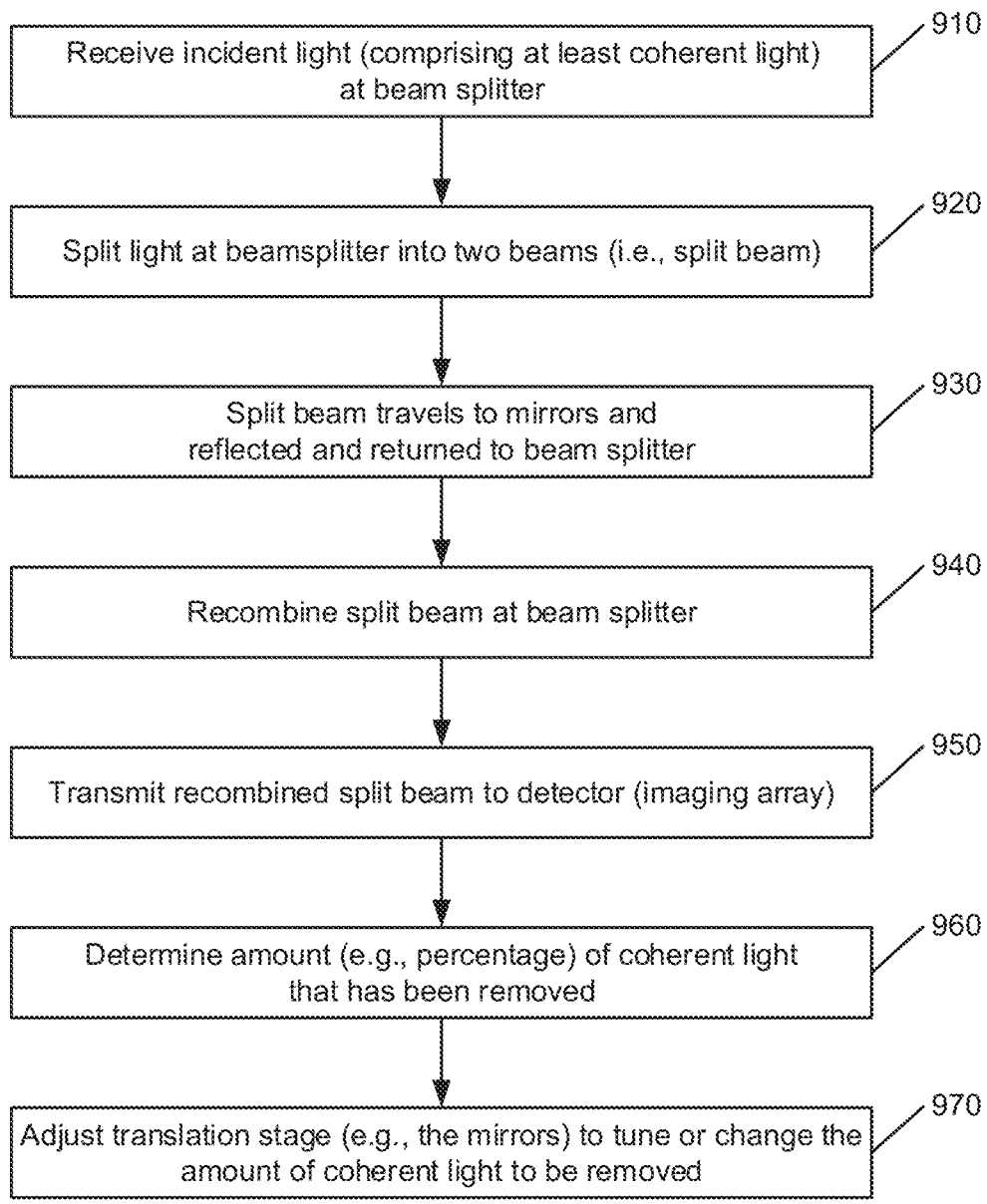
FIG. 9 is an operational flow of an implementation of a method for tunable coherent light filtering.

FIG. 9 is an operational flow of an implementation of a method 900 for tunable coherent light filtering. The method 900 may be implemented using the system 100.

At 910, incident light (which may be generated by a light source such as the laser 110) is received at a beam splitter, such as the beam splitter 130. The incident light may comprise coherent light and/or incoherent light.

At 920, the light is split into two beams by the beam splitter 130. At 930, the split beam travels the arms to the mirrors (e.g., the mirrors 140, 150) and reflected by the mirrors and returned to the beam splitter 130. At 940, the split beam is recombined at the beam splitter 730.

At 950, the recombined split beam is transmitted to a detector, such as the detector 160. At 960, the amount (e.g., percentage) of coherent light that has been removed may be determined, e.g., by the computing device 190. At 970, one or more of the mirrors may be adjusted (e.g., using a translation stage such as the translation stage 120) to tune or change the amount of coherent light to be removed (i.e., filtered).

It is noted that advantages and benefits of the embodiments described herein include: tunable filtering; the ability to differentiate between coherent and incoherent light; strong quenching of a coherent signal (e.g., depending on the optics, there may be a ~99% rejection of the coherent signal); broadband transmission of an incoherent signal; polarization insensitive; broadband (covers 3 µm-5 µm range or other infrared, UV, visible, or THz bands); and fast tuning.

It is contemplated that aspects of the invention may also be used to filter out a coherent pump laser in resonant excitation fluorescence spectroscopy.

FIG. 10 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system for implementing aspects described herein includes a computing device, such as computing device 1000. In its most basic configuration, computing device 1000 typically includes at least one processing unit 1002 and memory 1004. Depending on the exact configuration and type of computing device, memory 1004 may be volatile (such as random access memory (RAM)), non-volatile (such as read-only memory (ROM), flash memory, etc.), or some combination of the two. This most basic configuration is illustrated in FIG. 10 by dashed line 1006.

Computing device 1000 may have additional features/functionality. For example, computing device 1000 may include additional storage (removable and/or non-removable) including, but not limited to, magnetic or optical disks or tape. Such additional storage is illustrated in FIG. 10 by removable storage 1008 and non-removable storage 1010.

Computing device 1000 typically includes a variety of computer readable media. Computer readable media can be any available media that can be accessed by the device 1000 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

Computing device 1000 may contain communication connection(s) 1012 that allow the device to communicate with other devices. Computing device 1000 may also have input device(s) 1014 such as a keyboard, mouse, pen, voice input device, touch input device, etc. Output device(s) 1016 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   an interferometer comprising:
      a beam splitter configured to receive, from a light source, incident light comprising at least coherent light, and split the light into a split beam comprising two beams;
      two mirrors configured to each receive a beam of the split beam and reflect the beam back to the beam splitter for recombining into a recombined beam; and
      a detector configured to receive the recombined beam; and
   a computing device configured to determine an amount of the coherent light that has been removed from the incident light,
   wherein the interferometer is dynamically controlled via feedback from the computing device to dynamically block coherent light of the light source.

2. The system of claim 1, further comprising a translation stage configured to translate at least one of the two mirrors to tune the system to change the amount of the coherent light that is removed from the incident light.

3. The system of claim 1, wherein the interferometer is a Michelson interferometer, wherein the computing device is further configured to measure the light transmitted through the interferometer to determine the amount of the coherent light that has been removed from the incident light.

4. They system of claim 1, wherein the interferometer is a mid-wave IR interferometer.

5. The system of claim 1, further comprising the light source configured to generate the incident light and transmit the incident light to the beam splitter.

6. The system of claim 1, wherein the incident light has wavelengths in the range from ultraviolet (UV) to visible to terahertz (THz).

7. The system of claim 1, wherein the incident light further comprises incoherent light.

8. The system of claim 1, wherein the incident light is in a mid-infrared (mid-IR) wavelength range.

9. The system of claim 1, wherein the detector is an imaging array.

10. The system of claim 1, wherein at least one of the mirrors is a micro-electromechanical systems (MEMS) mirror array.

11. The system of claim 1, wherein the system is configured to filter coherent infrared (IR) light from a thermal background for protection of IR imaging arrays and detection systems.

12. A method for filtering coherent infrared light from a thermal background for protection of infrared (IR) imaging arrays and detection systems, the method comprising:
   receiving incident light, from a light source, at a beam splitter of an interferometer;
   splitting the incident light into a split beam;
   transmitting the split beam down the length of two arms to two mirrors of the interferometer;
   reflecting the split beam back to the beam splitter;
   recombining the split beam into a recombined beam at the beam splitter;
   transmitting the recombined beam to a detector of the interferometer;
   determining, using a computing device, an amount of coherent light that has been removed from the incident light; and
   dynamically blocking coherent light of the light source using the interferometer and feedback from the computing device.

13. The method of claim 12, further comprising translating at least one of the two mirrors to change the amount of the coherent light that is removed from the incident light.

14. The method of claim 12, further comprising transmitting the incident light to the beam splitter.

15. The method of claim 12, wherein the incident light has wavelengths in the range from ultraviolet (UV) to visible to terahertz (THz).

16. The method of claim 12, wherein the incident light comprises coherent light and incoherent light.

17. The method of claim 12, wherein the incident light is in a mid-infrared (mid-IR) wavelength range.

18. The method of claim 12, wherein the detector is an imaging array.

19. The method of claim 12, wherein the mirror is a micro-electromechanical systems (MEMS) mirror array.

20. The method of claim 12, wherein the beam splitter, the two mirrors, and the detector are comprised within a Michelson interferometer.

* * * * *